Jan. 20, 1959
L. C. NEUFELD
2,869,164
WINDSHIELD WIPER MOTOR CONTROL DEVICE
Filed July 12, 1954
2 Sheets-Sheet 1
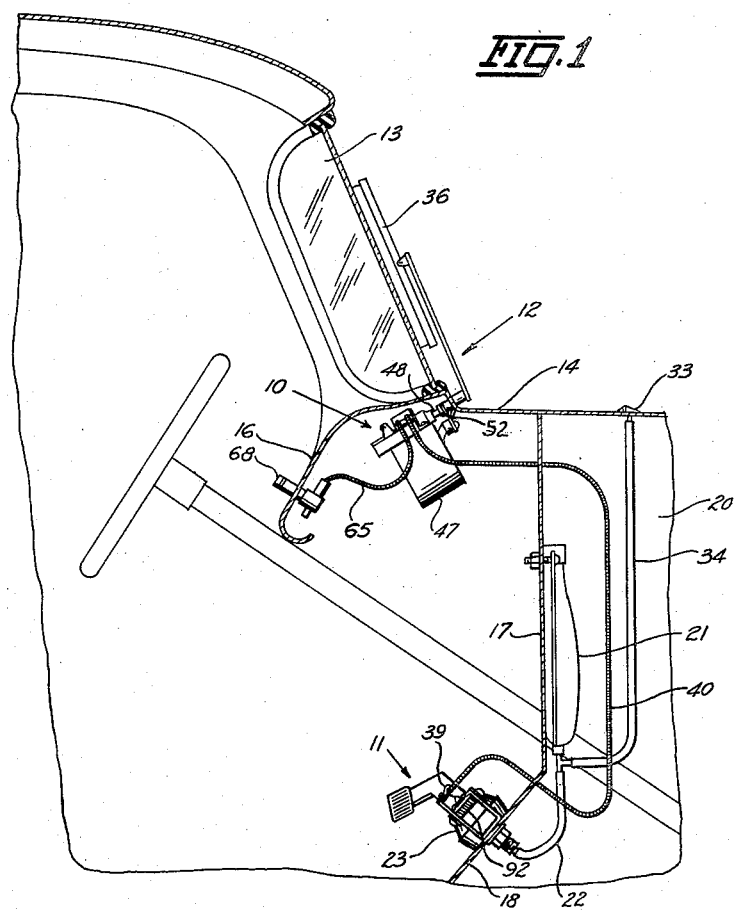
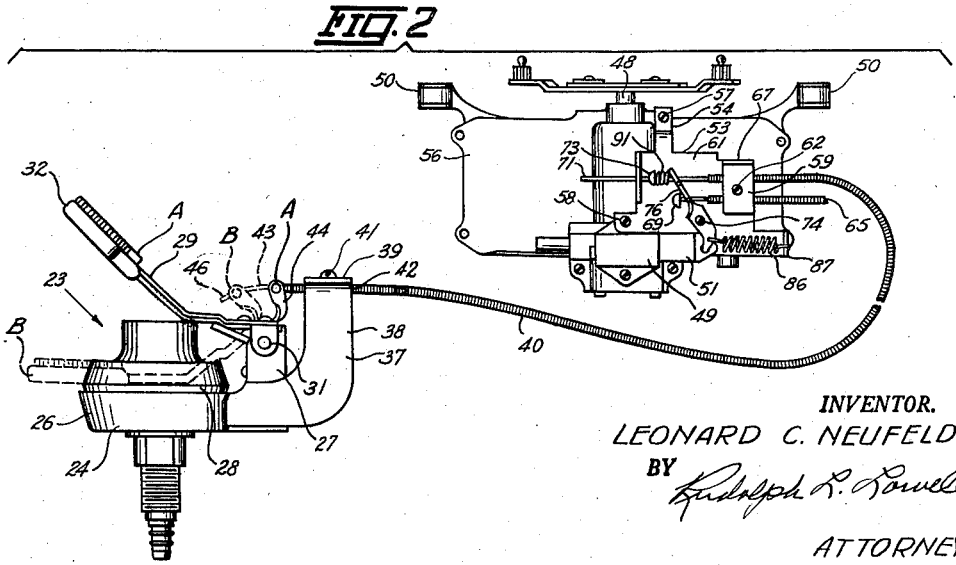
INVENTOR.
LEONARD C. NEUFELD
BY
*Rudolph L. Lowell*
ATTORNEY.

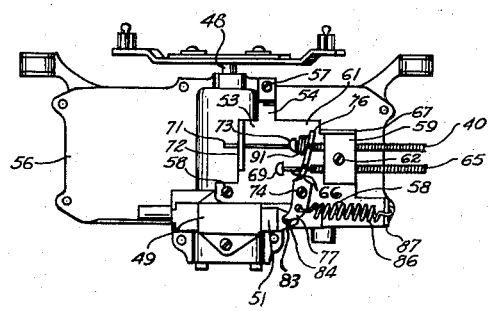
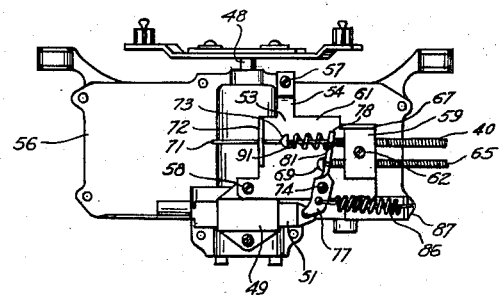
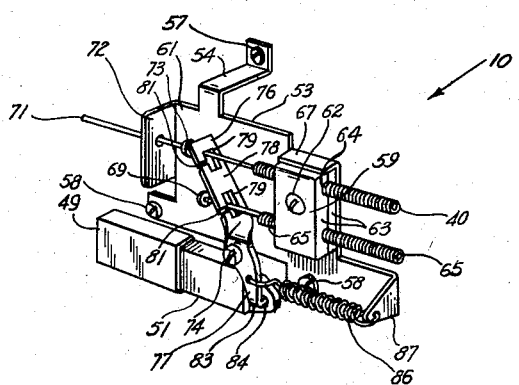

United States Patent Office 2,869,164
Patented Jan. 20, 1959

2,869,164

WINDSHIELD WIPER MOTOR CONTROL DEVICE

Leonard C. Neufeld, Des Moines, Iowa, assignor to The Delman Company, Cookeville, Tenn., a corporation of Tennessee Application July 12, 1954, Serial No. 442,745

3 Claims. (Cl. 15—250.4)

This invention relates generally to vehicle windshield clearing systems and in particular to a control device providing for the concurrent operation of the wiper and washer units in such systems, or for the operation of only the wiper unit.

An object of this invention is to provide a control device for a vehicle windshield wiper unit for adapting the unit for operation in response to and concurrently with operation of a windshield washer unit as well as in response to the usual hand control for the wiper unit.

Another object of this invention is to provide an attachment for a conventional suction operated windshield wiper motor in a vehicle windshield clearing system, for adapting such motor to operation both by the usual hand control and in response to actuation of a manually operated washer unit.

A still further object of this invention is to provide a control attachment for the wiper unit in a vehicle windshield clearing system, which is of a simple and compact construction, economical in cost and installation, and efficient in operation to provide for the operation of the wiper unit concurrently with the vehicle washer unit or the operation of the wiper unit alone, as these respective operations are required during driving.

Further objects, features, and advantages of this invention will become apparent from a consideration of the following description when taken in conjunction with the accompanying drawing in which:

Fig. 1 is a fragmentary foreshortened longitudinal section view of a vehicle showing the assembly therewith of a windshield clearing system embodying the wiper unit control attachment of this invention;

Fig. 2 is a composite illustration of a wiper motor and pump structure shown in assembly relation with the control device of this invention, with the motor being shown in an enlarged plan view and the pump structure in an enlarged side elevational view;

Fig. 3 is an enlarged top plan view of the wiper motor and the control attachment therefor showing the positions of the control attachment parts when the wiper motor is concurrently operated with the washer unit;

Fig. 4 is an enlarged top plan view, illustrated similarly to Fig. 3, and showing the position of the control attachment parts when the wiper motor is operated independently of the washer unit; and Fig. 5 is an enlarged perspective view of the wiper motor control attachment of this invention, shown in assembly relation with the wiper motor actuating member, and showing the control attachment parts in positions corresponding to an "off" condition of the wiper motor.

With reference to the drawing, the wiper motor control attachment of this invention, indicated generally at 10, is illustrated in Fig. 1 in assembly relation with a vehicle windshield clearing system which includes a windshield washer unit and a windshield wiper unit designated generally as 11 and 12, respectively. The vehicle is illustrated as having a windshield 13, an engine cowl 14 extended forwardly of the windshield, and an instrument panel or dash board 16 located rearwardly of the windshield 13. The vehicle is further equipped with the usual upright fire wall 17 and an upwardly and forwardly inclined floorboard or toe board section 18 which joins with the lower end of the fire wall 17.

The windshield washer unit 11 includes a flexible bag-type water container or reservoir 21 mounted on the fire wall 17 within the engine compartment 20 and communicating through a fluid line or hose 22 with a foot operated pump unit 23 clamped to the top side, and projected through, the inclined floorboard portion 18. The pump unit 23 is described in detail in applicant's prior application Serial No. 393,826 filed November 23, 1953.

As best appears in Fig. 2, the pump unit 23 generally includes a bracket member 24 having a cup-shape base portion 26 formed integral with an upright leg portion 27. Received, in a nested relation, within the base portion 26 is a hollow rubber body or pump member 28 adapted to receive fluid. An irregular shaped operating lever 29, pivotally connected at one of its ends by a pivot 31 to the free or upper end of the leg portion 27, operates on downward pivotal movement thereof, to collapse the body member 28 and thus expell fluid therefrom. A rubber sleeve 32 on the free end of the lever 29 facilitates foot operation of the lever 29 by the vehicle driver.

An L-shape support member 37 (Fig. 2) is attached to the pump bracket 24 such that one leg portion 38 of the support 37 is positioned substantially parallel with and spaced from the bracket member leg portion 27. The top end of the support leg portion 38, which is spaced above the top end of the bracket leg portion 27, carries a clamp, indicated generally at 39 (Figs. 1 and 2), which has an upright bolt 41 extended therethrough for engagement with the support member 37. Received within the clamp 39 is a Bowden wire 43, the casing 40 for which has one end portion 42 securely held within the clamp 39 on tightening of the bolt 41. An upwardly extended ear 44, on the end of the actuating lever 29 adjacent the pivot 31, is connected to the free end 46 of the wire 43, for a purpose to appear later.

A nozzle 33 (Fig. 1), attached to the cowl 14 at a position forwardly of the windshield 13, is connected with the reservoir 21 through a fluid line or hose 34. On downward swinging movement of the lever 29, fluid under pressure is supplied to the nozzle 33 for discharge upwardly onto the windshield 13 and into the path of movement of a windshield wiper 36, which forms part of the windshield wiping unit 12.

The wiper unit 12 also includes a suction motor 47 (Figs. 1 and 2), of conventional vane type, having a drive shaft 48 and provided with a valve 49 (Figs. 2 to 5, inclusive) which is operated by a reciprocally movable actuating or control member 51. The motor 47 has mounting sections 50 which receive bolts (not shown) to secure the motor 47 on the underside of the cowl 14. The motor drive shaft 48 is connected with the wipers 36 through a transmission mechanism indicated at 52 in Fig. 1.

The wiper motor control attachment 10 is illustrated in Figs. 2 to 5, inclusive, as including a bracket or body member 53 of an irregular flat shape and including a laterally extended L-shape mounting leg 54. The bracket 53 is assembled on the top side 56 of the suction motor 47, at a position adjacent the valve actuating member 51, by a mounting screw 57 extended through the L-shape mounting leg 54 into the motor 47. Similar screws 58 are extended through opposite end portions of the bracket member 53 into the side 56 of the motor 47.

A Bowden wire clamp or holding unit 59 is attached to the top side 61 of the bracket member 53 by means of a screw 62 extended through the unit 59 and the bracket 53, with an upright flange 67 on the bracket 53 contacting one end of the unit 59 to maintain the same against twisting on the bracket 53. The clamp unit 59 consists of a pair of clamp blocks 63 having pairs of transverse grooves 64 positioned opposite each other for receiving end portions of the casings 40 and 65 for Bowden wires 43 and 66, respectively. On tightening of the screw 62 the casings 40 and 65 are securely held within the clamp unit 59 and between the clamp blocks 63. As previously described, the actuating end of the wire 43 is connected to the ear 44 on the washer pump unit 23. The actuating end of the wire 66 is connected to a conventional hand control knob 68 carried on the vehicle instrument panel 16.

The wire 66 is extended through the clamp 59 and has its working end provided with a knob 69 for a purpose to appear later. The wire 43 is also extended through the clamp 59 and has its working end 71 projected through an upwardly extended guide flange 72 formed on the bracket member 53. Intermediate the guide flange 72 and the clamp unit 59, the wire 43 has a knob 73, similar to the knob 69 on the free end of the wire 66, all for a purpose to appear later.

Pivotally mounted intermediate its ends on a screw 74 extended through the bracket 53 and into the top side 56 of the motor 47, and at a position intermediate the guide flange 72 and the clamp 59, is an actuating lever 76, which is twisted so as to have an end section 77 positioned in a plane parallel to and spaced above the top side 61 of the bracket 53, and an end section 78 positioned in a plane perpendicular to the bracket 53 between the flange 72 and the clamp 59. The lever section 78 is formed with rectangular openings or slots 79 through which the working ends of the wires 43 and 66 are extended. The slots 79 are of a width less than the diameter of the knobs 69 and 73 on the wires 43 and 66, respectively, to limit the movement of the wires in one direction through the slots 79. For a purpose to appear later, a compression spring 91 is interposed on the wire 43 between the knob 73 and the lever section 78. Connecting or entrance slots 81 are formed in the lever section 78 for initially positioning the wires 43 and 66 within the slots 79.

The lever section 77 has a portion projected beyond the pivot 74 which is formed with a laterally extended reduced portion 83 positioned within an opening 84 formed in one end of the valve actuating member 51. A spring 86 extends between the lever section 77 and a laterally extended ear 87 formed on the bracket 53 substantially opposite the valve actuating member 51. The spring 86 biases the valve actuating member 51 to a closing position for the valve 49 which corresponds to the "off" condition of the motor 47 and a "parked" position of the wipers 36. It is seen, therefore, that a pull on either of the Bowden wires 43 or 66 operates to move the lever 76 in a clockwise direction as viewed in Figs. 3, 4 and 5 as a result of the forces exerted by the knobs 69 and 73 for the wires 66 and 43, respectively, on the lever section 78. Such clockwise movement of the lever 76 moves the valve actuating member 51 to open the valve 49 and start the motor 47 in operation.

In the operation of the wiper motor control device of this invention, assume that it is desired to operate the washer unit 11 and wiper unit 12 concurrently to clean the vehicle windshield 13. The vehicle driver, by manipulation of his foot, exerts a downward pressure on the pedal 32 of the actuating lever 29 for the washer pump assembly 23, so as to move the lever 29 downwardly from its solid line position A in Fig. 2 to its dotted line position B. This movement of the actuating lever 29 collapses the rubber body member 28 to thereby force the fluid therein through the fluid lines 22 and 34 to the discharge nozzle 33, from which the fluid is expelled as jets of fluid onto the windshield 13.

As best appears in Fig. 2, on movement of the actuating lever 29 from its position A to its position B, the ear 44 on the pivoted end of the lever 29 is swung in a counterclockwise direction as viewed in Fig. 2 and is likewise moved from its solid line position A to its dotted line position B shown in Fig. 2. This movement of the ear 44 exerts a pull on the Bowden wire 43 to thus move the knob 73 on the working end of the wire 43 to the right as viewed in Fig. 3 to thereby compress the spring 91 on the wire 43 and swing the lever 76 in a clockwise direction as viewed in Fig. 3. Such movement of the lever 76 moves the valve actuating member 51 to its valve opening position to thereby start the wiper 36 in operation. As a result the wiper 36 is operated concurrently with, and in response to, the operation of the washer unit 11. Movement of the wire 43 in this manner does not affect wire 66 because of the lost motion connection afforded wire 66 by the lower slot 79 in lever 76 and the knob 69. Thus wire 43 is independently operative relative to wire 66 for moving the pivoted lever 76.

The spring 91 on the wire 43 reduces the amount of movement transmitted to the lever 76 by the ear 44 on the washer unit actuating lever 29. In other words, the spring 91 constitutes a resilient lost motion connection between the knob 73 and the lever 76 to compensate for variations in the effective pivotal movement of the ear 44. The spring 91 is thus compressed (Fig. 3) between the knob 73 and the lever 76 to reduce or take up excessive movement of the ear 44 to actuate the wire 43. Also the guide flange 72 is provided for the working end 71 of the wire 43 to guide the knob 73 and maintain the same against binding with the lever 76, during movement of the wire 43.

On removal of the driver's foot from the lever 29, a torsion spring 92 on the lever pivot 31 returns the lever 29 to its solid line position A.

On movement of the pump unit actuating lever 29 to position A, the pull exerted on the wire 43 by the ear 44 is released, and the spring 86 moves the lever 76 counterclockwise to return the valve actuating member 51 to a position (Figs. 2 and 5) corresponding to an "off" condition of the wiper motor 47.

Now assume that it is merely desired to operate the windshield wiper 36, without any operation of the washer unit 11. The knob 68 on the dash 16 is merely turned to exert a pull on the wire 66 and thus move the knob 69 on the free end of the wire 66 from its position shown in Fig. 2 to its position shown in Fig. 4, which corresponds to the "on" position of the wiper motor 47.

It is seen, therefore, that the lever 76 has been moved by the Bowden wire 66 to the same position to which it was moved by the Bowden wire 43, as will be apparent from a comparison of Figs. 3 and 4. It is also obvious that, since the lever 76 is movable freely relative to wire 43 due to the free sliding relationship of the upper slot 79 in lever 76 and the wire 43 in a lost motion manner, the actuation of the lever 76 by the wire 66 does not affect the wire 43. The actuation of operating lever 76 by the wire 66 is therefor seen to be independent of the similar type of actuation by wire 43.

The windshield wiper 36 remains in operation until the manual knob 68 on the dash 16 is reversely manipulated to release the pull of the wire 65 on the lever 76. The spring 86 then returns the lever 76 and the valve actuating member 51 to positions corresponding to an "off" position of the wiper motor 47.

From the above description it can be seen that the control attachment 10 of this invention provides for operation of the windshield wiper motor 47 in response to either manipulation of the washer unit 11 or the conventional manual control knob 68 on the vehicle instrument panel 16. The windshield wiper can thus be operated independently of or in conjunction with the washer unit 11 depending on driving conditions. The position of the wires 43 and 66 within the slots 79 in the lever 76, for operation of the lever 76 by the knobs 69 and 73 on the wires 66 and 43, respectively, provides for a quick movement of the valve actuating member 51 in response to movement of the wires 43 and 66 with a minimum of friction involved in the manipulation of the lever 76. Further, with this arrangement of the wire 40 and the lever 76, the windshield wiper 36 is operated substantially immediately on operation of the washer unit actuating lever 29.

Although the invention has been described with respect to a preferred embodiment thereof, it is to be understood that it is not to be so limited, since changes can be made therein which are within the full intended scope of this invention as defined by the appended claims.

I claim:

1. For use with a vehicle having a windshield wiping unit including a wiper, a power unit for operating said wiper having a reciprocally movable control member, and a windshield washer assembly including a nozzle and a pump unit for supplying fluid under pressure to said nozzle, a pivoted actuating member connected to the power unit and engaging said control member, a first actuating means for said pivoted member connected to the pump unit and being responsive to pump unit operation for moving said pivoted member to operate said power unit control member, said first actuating means being connected to the pivoted member through a first lost motion connection, a second manual actuating means independent of said first actuating means and connected to said pivoted member through a second lost motion connection for moving said pivoted member to operate said power unit control member, the said lost motion connections of the two said actuating means with the pivoted member permitting independent operation of the power unit control member by said actuating means, and means for biasing said pivoted member against movement in the power unit operating direction.

2. For use with a vehicle having a windshield wiping unit including a wiper, a power unit for operating said wiper having a reciprocally movable control member and a windshield washer assembly including a nozzle and a pump unit for supplying fluid under pressure to said nozzle; a pedal for actuating said pump unit, a pivoted operating member connected to the power unit and engaging said control member, a first actuating means connecting said pivoted operating member and the pedal for moving the pivoted member to operate said power unit control member, said first actuating means being connected to the pivoted member through a first lost motion connection, an actuating knob for actuating the power unit, means connecting said actuating knob to the pivoted member to transmit operating motion to the power unit control member, said last connecting means including a second lost motion connection with the pivoted operating member, the said lost motion connections of the two said actuating means with the pivoted operating member permitting independent operation of the power unit control member by said knob and pedal through their respective actuating means and means for biasing said pivoted member against movement in the power unit operating direction.

3. For use with a vehicle having a windshield wiping unit including a wiper, a power unit for operating said wiper having a reciprocally movable control member, and a windshield washer assembly including a nozzle and a pump unit for supplying fluid under pressure to said nozzle, a pivoted operating member secured to said power unit, said pivoted operating member having one end thereof engaging said movable control member, the portion of the operating member on the opposite side of the pivoted connection from the control member engaging end being provided with a pair of openings, a first actuating means for said pivoted operating member connected to the pump unit and being responsive to pump unit operation for moving said pivoted operating member to operate said power unit control member, said first actuating means comprising a wire extending freely through one opening of the pivoted member and being provided with a stop element of greater diameter than the opening to thereby form a first lost motion connection, a second manual actuating means independent of said first actuating means and connected to said pivoted member for moving said pivoted member to operate said power unit control member, said second actuating means comprising a wire extending freely through the other of said pair of openings in the pivoted member and being provided with a stop element of greater diameter than the opening to thereby form a second lost motion connection, the said lost motion connections of the two said actuating means with the pivoted member permitting independent operation of the power unit control member by said actuating means and means for biasing said pivoted member against movement in the power unit operating direction.

References Cited in the file of this patent

UNITED STATES PATENTS

| 1,183,043 | Scott | May 16, 1916 |
| 2,128,878 | Horton | Aug. 30, 1938 |
| 2,162,985 | West | June 20, 1939 |
| 2,769,194 | Oishei | Nov. 6, 1956 |
| 2,743,473 | Oishei | May 1, 1956 |

FOREIGN PATENTS

| 465,681 | Canada | June 6, 1950 |